United States Patent
Prokoski (10) Patent No.: US 7,292,994 B2
(45) Date of Patent: Nov. 6, 2007

(54) SYSTEM AND METHOD FOR ESTABLISHING VALUE AND FINANCING OF INTELLECTUAL PROPERTY

(75) Inventor: Francine J. Prokoski, Fairfax Station, VA (US)

(73) Assignee: Mikos, Ltd., Fairfax Station, VA (US)

( * ) Notice: Subject to any disclaimer, the term of this patent is extended or adjusted under 35 U.S.C. 154(b) by 1322 days.

(21) Appl. No.: 09/783,856

(22) Filed: Feb. 15, 2001

(65) Prior Publication Data

US 2002/0046038 A1    Apr. 18, 2002

Related U.S. Application Data

(60) Provisional application No. 60/182,641, filed on Feb. 15, 2000.

(51) Int. Cl.
*G06F 17/60* (2006.01)

(52) U.S. Cl. .................. 705/35; 705/35; 705/36 R; 705/37

(58) Field of Classification Search ............... None
See application file for complete search history.

(56) References Cited

U.S. PATENT DOCUMENTS

| 5,361,201 A | 11/1994 | Jost |
| 5,999,907 A | 12/1999 | Donner |
| 6,018,714 A | 1/2000 | Risen, Jr. |
| 2001/0042034 A1* | 11/2001 | Elliott .................. 705/35 |

OTHER PUBLICATIONS

Federal Tax Code relating to Real Estate Investment Trusts (REITs).

* cited by examiner

*Primary Examiner*—Vincent Millin
*Assistant Examiner*—Debre Charles
(74) *Attorney, Agent, or Firm*—Whitham, Curtis, Christofferson & Cook, PC (57) ABSTRACT

The invention provides a system and method for developing intellectual property (IP) assets, by collecting one or more IP assets in accordance with a characterization; determining a market value for the collection in accordance with a plurality of uses for the assets so characterized; holding the collection in an investment trust (IT), which is sold to investors; and exploiting the collection, using investor contributions to make markets for the various uses of the asserts, obtaining revenue in these markets, and distributing profits to the investors.

20 Claims, 4 Drawing Sheets

SYSTEM AND METHOD FOR ESTABLISHING VALUE AND FINANCING OF INTELLECTUAL PROPERTY

This application for patent claims priority from U.S. Provisional Patent Application No. 60/182,641 filed Feb. 15, 2000.

BACKGROUND OF THE INVENTION

1. Field of the Invention

The present invention relates to a financial instrument for valuing and financing intellectual property, and more particularly relates to a system and method which applies principals and practices of real estate investment trusts (REITs) to the valuation of intellectual property and financing of its development and exploitation 2. Background Description The "appraised value" of a real estate parcel, or property, comprises some estimate of the full market value of the property on a specified date. A property's appraised value is of great importance in many types of real estate transactions, including sales and loans.

Conventionally, appraised value is determined by a professional appraiser using both objective and subjective factors. One disadvantage of such a method is the difficulty in ensuring that the appraiser conducts a neutral, unbiased analysis in arriving at the appraised value. This difficulty is often compounded by the fact that the appraiser may be retained and paid by an interested party in the contemplated transaction, such as a lender, mortgage broker, buyer, or seller.

In order to reduce bias and provide more accurate appraisals, statistical techniques may be used to obtain an independent, consistent, mathematically derived estimate of a property's value to assist an appraiser in generating an appraised value. Traditional statistical techniques, such as multiple linear regression and logistic regression, have been tried, but such techniques typically suffer from a number of deficiencies. One deficiency is the inability of traditional regression models to capture complex behavior in predictor variables resulting from nonlinearities and interactions among predictor variables. In addition, traditional regression models do not adapt well to changing trends in the data, so that automated model redevelopment is difficult to implement.

One example of the difficulty of applying a regression model to appraisal problems is the uncertainty as to the optimal temporal and geographical sample size for model development. A model developed using all homes in one square city block might theoretically be an effective predictor for that particular neighborhood, but it may not be possible to develop such a model with sufficient stability and reliability, due to the relatively small sample size. On the other hand, a model developed using all homes sold in the United States in the past month might have a sufficiently large sample size, but might be unable to capture local, neighborhood characteristics to provide an accurate appraisal. Thus, a significant deficiency of traditional regression modeling techniques when applied to real estate appraisals is the inability to successfully model neighborhood characteristics while including a sufficiently large sample size to develop a robust, stable statistical model.

It is desirable, therefore, to have an automated system that uses available information regarding real estate properties to provide accurate estimates of value. Preferably, such a system should be flexible enough to allow model development in a relatively small geographic area, it should be able to handle nonlinearities and interactions among predictor variables without advance specification, it should have high predictive accuracy, and it should have capability for redevelopment of the underlying system model as new patterns of real estate pricing emerge.

Similarly, in the case of intellectual property, there is both a need for and a difficulty with obtaining fair market valuation at a particular time and stage of development of the IP. There are some differences between IP and RE valuations, including the fact that geography, that is the country or countries in which the IP rights exist, may be expanded. This multiplier effect is of course not seen with real property, which by its nature must stay put. Also, geography enters into IP development in the sense that the rights associated with it may be divided among many persons, each of whom can develop and/or market in separate or overlapping geographic areas.

SUMMARY OF THE INVENTION

It is therefore an object of the present invention to provide a system and method for establishing value and financing intellectual property.

It is another object of the invention to have an automated system that uses available information to provide accurate estimates of the value of intellectual property, and do so taking into account the particular time and stage of development of the intellectual property.

It is a further object of the invention to use means of collecting and aggregating intellectual property assets for the foregoing objects in a manner that enhances value.

Patents, trademarks, service marks, trade secrets, trade dress rights and copyrights, referred to collectively herein as "intellectual property," provide an owner with the right to exclude others from making, using or selling particular product and services. An Intellectual Property Investment Trust (IP IT) is defined herein as a financial instrument or trust which invests primarily in intellectual property, that is in patents, copyrights, trademarks, and trade secrets.

The system and method of this invention provide in one embodiment a mechanism to value and finance intellectual property which includes: (a) obtaining rights to at least one intellectual property asset (b) determining a market value of the at least one intellectual property asset, (c) configuring an investment trust which holds the intellectual property asset, (d) selling stock in the investment trust, (e) managing the intellectual property including promoting it, licensing it, developing prototypes, offering it for sale, and such other activities as are commonly performed with intellectual property, (f) distributing profits and losses from the managing under arrangements made with the stockholders, (g) utilizing current and future tax advantages offered to such an IP IT for the benefit of its stockholders.

In another embodiment the invention provides A method for developing intellectual property (IP) assets, by collecting one or more IP assets in accordance with a characterization; determining a market value for the collection in accordance with a plurality of uses for the assets so characterized; holding the collection in an investment trust (IT), which is sold to investors; and exploiting the collection, using investor contributions to make markets for the various uses of the assets, obtaining revenue in these markets, and distributing profits to the investors.

The invention provides a method for valuing an intellectual property asset by describing the asset to be valued, making a valuation of the other assets in the collection, auctioning ownership of part or all of the asset to be valued, and thereby establishing the value of the asset to be valued. The valuation of the other assets can be based upon their present value to the holder of rights to the assets, or upon the estimate of the revenue to be generated during the life of the assets, or upon the successful auction price paid for them.

Implementation of the invention requires a system for selling intellectual property rights through a corporation or other legal entity which owns the intellectual property rights, by selling stock in the entity. The operation of the entity requires a method for obtaining revenue, a method for distributing revenue (minus costs) to stockholders, and a method for making a market in the stock. The method for obtaining revenue may include the licensing of the entity's intellectual property, the development and sale of products incorporating the intellectual property, and the sale of additional stock.

The intellectual property owned by the entity is collected together according to common market valuation features. The IP rights which are collected include patent rights, patent application rights, trademark rights, service mark rights, copyright rights, trade secret rights and trade dress rights. The feature which may be the basis for collecting such rights into a common group may be, for example, that each member of the collection is from a particular area of technology, or the same markets for application, or the same area of social concern, or the same area of recreational interest, or the same geographic area, or because each member of the collection meets certain specifications as to their expiration dates, or were developed by previously successful inventors or authors, or were obtained from successful companies or selected universities or from the US federal government, or have coverage in or more selected foreign countries, or would benefit from the same technology breakthrough, or have a collective valuation greater by a certain factor than the sum of the individual values. Another basis for inclusion in the collection could be that each member of the group was selected for inclusion by a stockholder.

The assets of an IP IT may include insurance on the intellectual property against devaluation, infringement to or by the trust, or other potential losses for which insurance can be obtained.

If valuation is by auction, the opening bid may be determined by a predictive model for the valuation of the intellectual property, such as a neural network, by the current market price of a collection of stocks in companies which could be customers for the IP IT's portfolio, or the current market price of other IP ITs, or the current market price of a collection of stocks in companies which utilize similar intellectual property. Or the opening bid could be determined based upon an expert's estimate, or by a formula which includes: remaining life of the IP, number of IP items, and other standard considerations in valuing IP.

The prospectus for the IP IT may include a description of the funds to be allocated to each IP.

Just as REITs trade like stocks and deal almost exclusively in real estate, IP ITs would trade like stocks and invest almost solely in IP. Just as real estate has cycles, so too does technology. Just as office buildings, or strip malls, or single family house prices for sales or leases may go up and down; the value of IP may also change. However, RE is by nature local; and IP is by nature portable-depending on the country or countries in which the IP rights pertain, and where the markets are.

The combination of return to investors through stock and asset appreciation and distribution of generated revenue is an attractive feature of both RE and IP investment trusts. Total return in both cases includes dividend growth and share price appreciation.

REITs pay no corporate income tax, but are required to distribute 90% of their taxable income (from rents and asset sales) to stockholders as dividends. For investors, that means no double taxation of the income. A similar situation would be proposed for IP ITs.

Just as REITs allow investors to become involved with selected real estate markets even when they have only a small amount of money to invest, IP ITs would allow investors to become involved with selected technology markets through a small investment.

Furthermore, IP ITs would provide an early opportunity for investors to bet on technologies without waiting for companies to be formed and develop a track record.

Grouping of IP assets allows investors to select core technologies, or other special interests which may become the basis for major companies or new markets in the future.

Groupings allow investors to invest in for example medical areas of special interest to them: genetic engineering, cancer treatments.

Groupings allow investors to invest in bundles of special social significance to them, such as electric cars, low pollution cars, etc.

IP ITs would provide early investment capital to inventors without them needing to first raise enough money to buildup a company and do a registration statement. IP ITs allow inventors to concentrate on the invention process without prematurely needing to focus on developing a business plan or operating company.

IP ITs value, as with REITs, is not best determined by earnings per share; but by funds from operations (FFO). FFO is net income excluding gains or losses from sales of property or debt restructuring and adding back depreciation.

The health of an IP IT, as with a REIT, can be shown by growth in FFO; and valuation may use the price-FFO multiple, instead of price-earnings ratio as used for stocks.

Hotel REITS may yield an FFO multiple of 9, health care 11, office 12. Some REIT valuations go to 16. Similar rules may be used to categorize an IP IT as to low to high risk. Risks can be related to yields, as for example specifying as risky an IP IT with FFO above 8.5%, which means little is being reinvested to build the value of the IP. Too much debt (debt to total capital of more than 40%) means that the underlying assets are not supplying enough operating capital. Too much or too little diversification can reduce the market appeal and thereby the market value of the IP IT.

An IP IT can provide financing services difficult for independent inventors and small companies to obtain, such as: maintenance of patents, prosecution of foreign patents, continuations and divisional applications, dealing with infringement suits, and tracking royalties due.

This invention also provides a mechanism for valuation of IP ITs. A key to setting up a REIT or IP IT is deciding how to compute the value of a collection of assets; thereby setting value on the shares. Traditionally REIT valuation methods, involving comparisons with similar real estate in the same general geographic location, provides an approximate value when there happens to have been recent sales of similar properties in the same area. However, when market are fluctuating, or when unusual properties or locations are involved, the direct comparison methods are less consistent.

More sophisticated methods of valuation, including neural network models which learn to weight various parameters, require many properties be considered in order to tune the network. The selection of parameters and starting weights is subjective.

Estimation of a current market value for real or intellectual property is subjective, regardless of method used, unless the property is actually sold for the best available price. The current invention includes the method of setting valuation on real or intellectual property by auctioning the shares of the holding company. The resulting market valuation will apply to the collection of IP held by the trust. Valuation of individual elements is derived from the composite market valuation.

The initial opening bid can be set at a desired amount which is chosen because it is presumed that a market will exist for the stock at that price, as in an IPO, or can be determined by an analysis using a formula to calculate the contribution of several parameters including:

Quantitative Values: periods remaining on the IP; licenses issued-exclusive and non-exclusive by market, geography, other aspect; performance requirements; payments; period of commitment; rating financials of the licensee; status of products in production; regulatory requirements prior to sales; and status; funds required for proof of principal; funds required for commercial prototype; funds required for US marketing; funds required for foreign marketing; annual costs of patent upkeep.

Qualitative Estimates: timeliness of product; is technology too early; window of time product to be used before overtaken by improvements; dependencies on other technologies being developed; credentials of the inventor.

Available Information on Competition: competing products; most similar patents; their assignees' financial ratings; their profitability; period of time remaining on competing patents.

Definitive Questions: what sector (biology, medicine, computer software, computer hardware, entertainment games, etc.).

Risk Evaluations: failure/success rate of inventor; failure/success rate of similar technologies; failure/success rate of companies in similar markets.

Overall Economic Factors: inflation rate, cost of money, balance of trade, stock market performance.

Market-Specific Events and Opportunities: window of market opportunity (e.g. a terrorist attack would have a subsequent effect on security products and services companies); estimated time to market of the technology; local, national, international scope of the IP and the markets.

Another method of valuation produces valuation curves for the life of the IP, and then selects the point corresponding to the current stage in the overall life. Coefficients for the shape of the curve are initially set by considering historical behavior of similar technologies which in the past have spawned successful companies or products or revenue streams. Working backwards, by a principal components analysis, coefficients are set which best match the historical valuation on the resulting technology or company. For the time before the company or technology had a valuation, an extrapolation can be performed using linear, exponential, or other method, with perhaps different models for different technologies, different sectors, or other variations. The combined valuation of multiple IP elements is computed by summing the individual values, and adding additional value to reflect inter-relationships among the IP which strengthen the market potential of the combination.

A variation on the method can be to establish valuation for each IP element. The steps include the following. Find one or more close or similar IPs which have produced a profitable business or technology and to which a current value can be assigned. Also find other valuations in the past on that technology, if any. Interpolate between available values to span the corresponding period of time. Extrapolate backwards to the time of filing or establishing the IP, using a selected model, which may be dependent upon the technology, business sector, or other factor. If there are more than one similar IP, similar as to the technology or market addressed, then combine the valuations into a combined curve. The combination can weight different IP differently, based on for example, the history of the inventor or the funding source or assignee. As the number of comparative IP samples is increased, the resulting "expected valuation" curve will represent the average performance of similar IP elements. The valuation of multiple IP elements is then computed as above.

DESCRIPTION OF THE FINANCIAL INSTRUMENT

Stocks and real estate have been the two traditional investments. The modern Real Estate Investment Trust (REIT) combines features of both. A REIT is a publicly traded corporation or trust that specializes in acquiring, developing, and managing real estate. Their shares are traded on national exchanges.

REITs allow investors to buy into a fast growing retail business, a new economic trend, and real estate all at the same time. REITs were first created by an Act of Congress in 1960, and have become one of the fastest growing sectors of the capital markets in the country.

Benefits of REITs include: No minimum investment is required; Diversification is achieved by pooling a number of properties; Liquidity is provided (unlike direct ownership of real property, mortgages, or investments in limited partnerships which can be difficult to unload at any price). REITs are not real estate limited partnerships. They trade over national exchanges along with other public companies. They are therefore liquid and have no requisite long-term commitments or penalties for early withdrawal.

Tax advantages of a REIT are quite favorable. The REIT does not pay corporate federal income taxes. This carries over to the state level as well, with most states not requiring REITs to pay state income tax. Therefore nearly all of a REITs income is distributed to shareholders with no double taxation of the income.

Types of REITs include:
1. Equity REITs which own real estate and derive revenue principally from rent;
2. Mortgage REITs which loan money to real estate owners and receive revenues from interest earned on their mortgage loans;
3. Hybrid REITs which combine both strategies.

IRS Revenue Code requires compliance with certain provisions: A REIT must be:
1. a corporation, business trust, or similar association;
2. be managed by a board of directors or trustees;
3. have fully transferable shares;
4. have a minimum of 100 shareholders;
5. have no more than 50% of the shares held by 5 or fewer individuals during the last half of each taxable year;
6. invest at least 75% of total assets in real estate;
7. derive at least 75% of gross income from rents from real property or interest on mortgages on real property;
8. derive no more than 30% of gross income from the sale of real property held for less than four years, securities held for less than six months, or certain prohibited transactions;

9. pay dividends of at least 90% of the REITs taxable income.

The intent of the Act of Congress creating REITs was to allow small investors access to investment in capital-intensive assets.

This invention uses the model of REITs and applies some of their features to the valuation and investment financing of intellectual property.

Small investors generally cannot participate in IPOs of high tech companies. The IP IT provides a way for small investors to participate at the earliest possible stage of new technology developments, even prior to formation of a company.

Investment decisions generally involve assessment of both the underlying business and the management of a company. In the case of IP ITs, investors can select a technology, a market, or other factor which appeals to them, and can review the credentials of the trust managers. Unlike the case where a young company with hot new technology may be managed by relatively inexperienced persons having minimal track records, bundling of multiple IP assets managed by experienced managers can insulate investors from many of the risks associated with high growth start-up companies. The result is to provide stability to the market for innovative technologies Increasing the stability of financial markets for high technology innovations provides increased protection for small investors, and may promote a willingness of large investors such as pension funds to take a stake in technologies which may individually be considered too risky, but which in combination provide a hedge against undue risk.

One cause of fluctuations in the stock market is the rapid run-up on prices of some technology-based stocks, during times when those technologies are in favor. The result is short-term which tends to further promote unstable markets. IP ITs would bring increased stability to high technology investments.

Conversion of assets to a REIT can entail tax consequences. The umbrella partnership REIT (UPREIT) was created to solve that problem. An UPREIT has the real property owned by an umbrella partnership with the REIT as its general partner. The UPREIT was first used in 1992, and now represents the majority of REITs. Similar provisions for asset conversion to an IP IT are suggested.

REITs have opened the world of commercial real estate to a tremendous number of small to large investors. IP ITs can likewise open investments in basic intellectual property to small investors.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
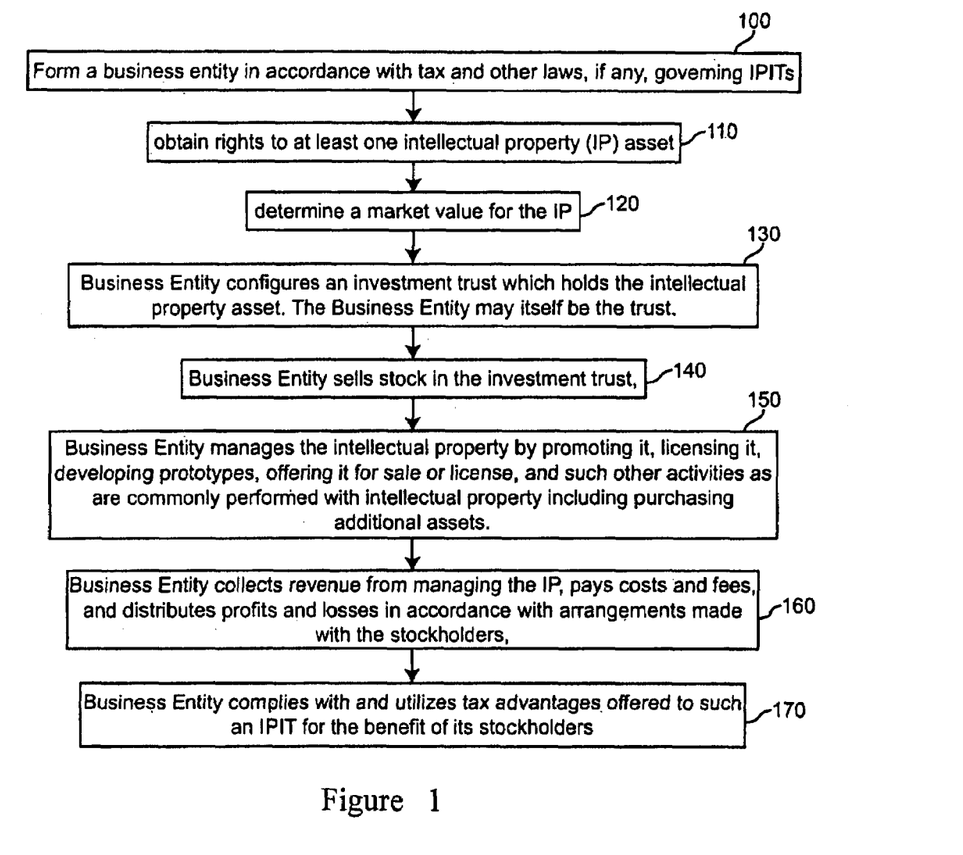
FIG. 1 is a flowchart illustrating a method for establishing an IPIT.

Referring now to the drawings, and more particularly to FIG. 1, there is shown the components of the financial instrument. A business entity is formed 100 which is in accordance with tax and other laws, if any, which govern establishment, ownership, size, and business structure of a company whose business is the exploitation of intellectual property. The entity obtains rights to one or more IP asset 110 and sets an initial valuation 120 for the IP. The entity establishes a trust 130 which holds the asset. The entity sells stock 140 in the trust. Proceeds are used to exploit the IP asset 150, acquire other IP assets, and other activities related to IP management 150 including purchasing additional assets. Revenue collected 160 is used to pay operating costs with the majority of the remainder being distributed to the stockholders in accordance with tax and other laws, and with the stockholder agreement. Modifications 170 to operating procedures are made as tax and other laws change, to provide additional benefits to stockholders.

Figure 2:
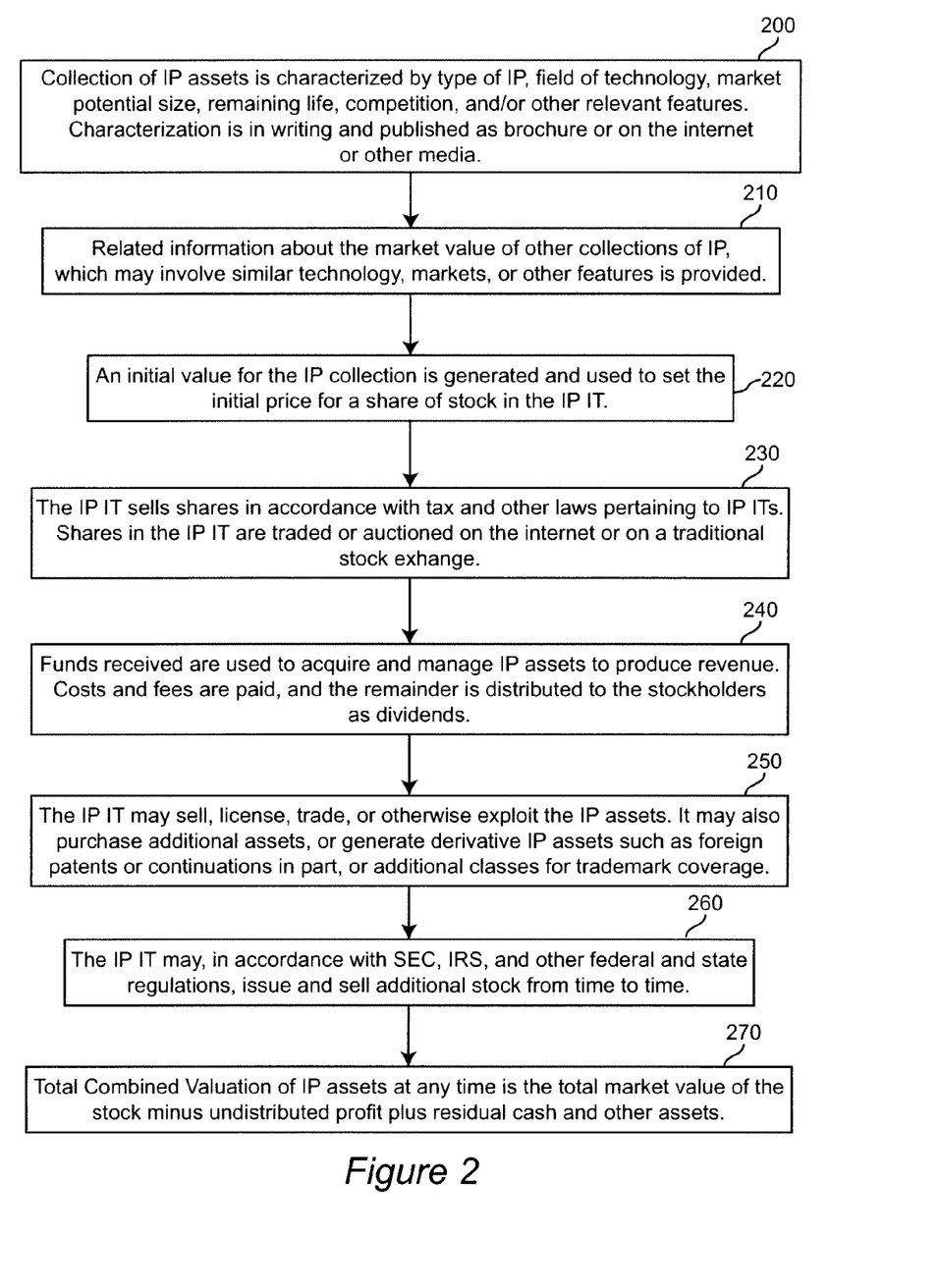
FIG. 2 is a flowchart showing a method for evaluating a collection of one or more intellectual properties according to a preferred embodiment of the invention.

FIG. 2 provides the method for valuation of the IP assets according to a preferred embodiment of the invention. The collection of IP assets 200 is characterized by type of IP, inventor, field of technology, market potential size, remaining life, competition, and/or other relevant features which are expected to be of interest to potential investors. The characterization is in writing and is published as a brochure, or prospectus, and distributed on the internet or other media. Related information 210 about the market value of other IP is provided. The other IP may be similar in terms of: inventor, technology field, markets addressed, or other characteristics. An initial value for the IP 220 is calculated based upon the valuation of the other IP 210, allowing for differences in the characteristics of 200 and 210. An initial price for shares of stock in the trust is calculated from the valuation. The trust offers the stock for sale 230 on an internet auction or through a traditional stock exchange, in accordance with applicable SEC and state regulations. Revenue is generated by sale of stock and by management of the IP assets 240. Operating costs are paid, additional IP may be acquired, and most of the balance is distributed to stockholders as dividends. The percent which must be distributed as taxable dividends to stockholders may be specified by tax and other laws. Activities involving exploitation of the IP assets 250 may include purchasing IP assets, generating derived IP assets, developing prototype products or systems based upon the IP, selling or licensing rights to any or all of the IP. The trust may also sell additional stock from time to time 260, as well as repurchase shares, in accordance with Federal, State, and local prevailing laws and regulations. The total valuation of its IP assets plus undistributed profit plus residual cash and other assets, at any time, is taken to be the market value 270 of the trust's stock.

Figure 3:
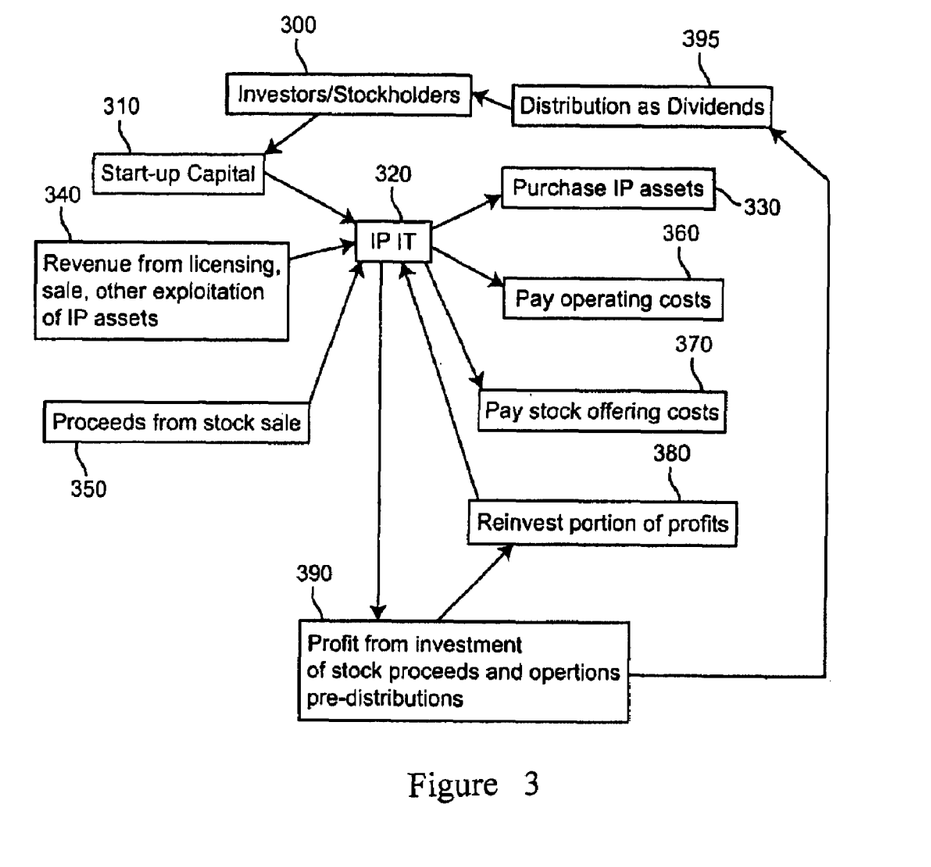
FIG. 3 is a flowchart showing the flow of money in a financial instrument according to the invention.

FIG. 3 presents the cash flow of the financial instrument of this invention. One or more investors 300 provide start-up capital 310 which is used to fund the IP IT 320. The IP IT purchases IP assets 330 which may include existing revenue-generating licenses. The IP IT manages the IP to generate revenue from licenses, sales, product development, contract research, and other activities 340. The Proceeds from those 340 activities and from sale of stock 350 in the IP IT are used to fund operating costs 360 and costs associated with the stock offering 370. Stock proceeds and profits 390 are partially reinvested 380 in compliance with Federal, State, and local laws regarding the time period allowed before funds must be distributed to the stockholders, and the percentage which may be reinvested or held within the IP IT. Profit is distributed to stockholders as dividends 395 quarterly or on an annual basis, or as otherwise specified by law and stockholder agreement.

Figure 4:
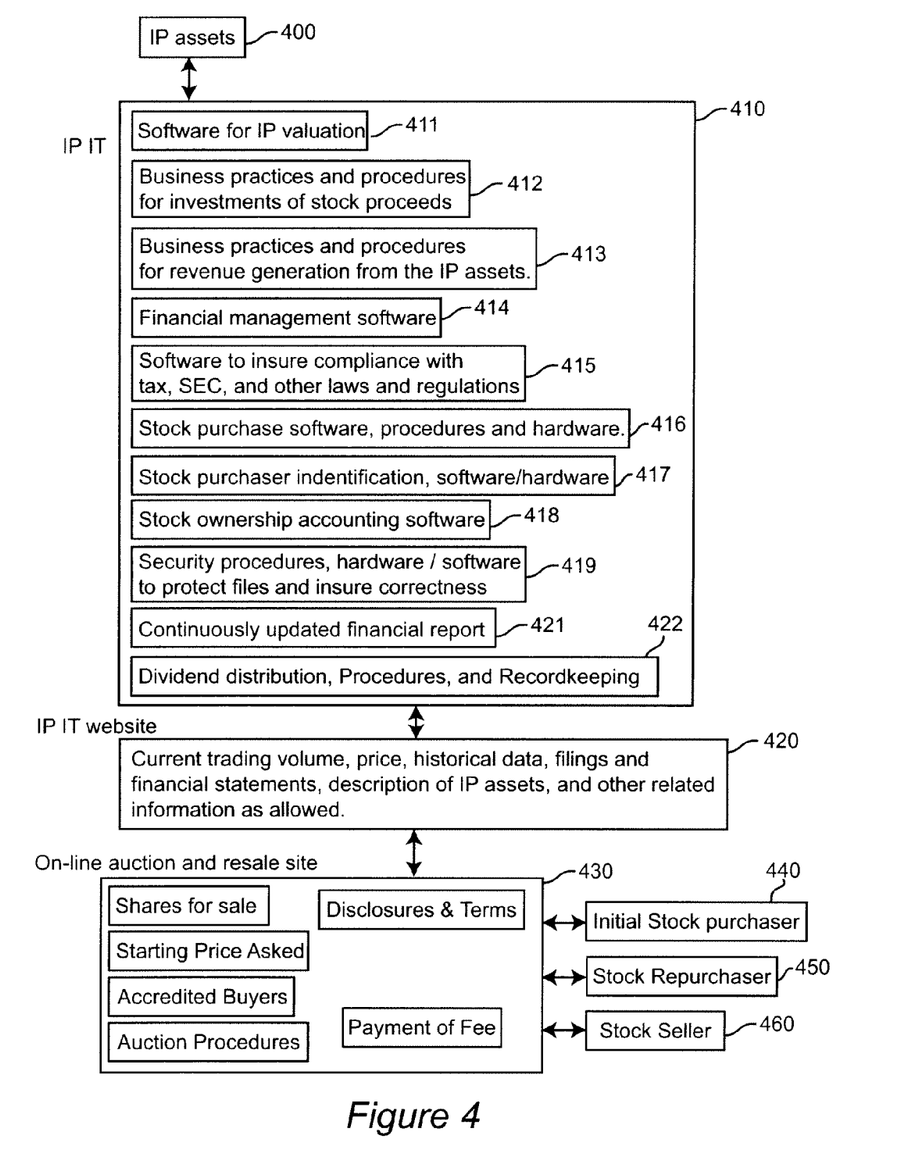
FIG. 4 shows an apparatus for valuing and financing IP.

FIG. 4 illustrates the system elements of the primary embodiment. A collection of IP assets 400 is acquired by an IP IT 410. The assets are valued based upon an algorithm 411. Procedures for selling stock in the IP IT 416 and investing stock proceeds 412 as well as procedures for generating revenue from the IP assets 413 are established. Software for financial management and forecasting 414 and for insuring compliance with laws and regulations 415 is used to generate a stock offering prospectus and an initial asking price for stock in the IP IT which is conveyed to the on-line auction and resale site 430.

The IP IT hosts a website on the internet 420 which provides information on the IP assets, the management experience of the IP IT, valuations on other IP which is in some way related to that of the IP IT, the business practices and procedures for managing the IP IT and other information as allowed by the SEC and other regulatory agencies. The financial report of the IP IT is continually updated 421 and extracts are posted on the IP IT website 420. The content of the posting is at times modified as needed in order to be in compliance with "quiet period" and other rules of the SEC and state agencies.

The on-line auction and resale site 430 uses an auction procedure appropriate to the size of the stock offering and the expected interest level of initial stock purchasers 440. A "Dutch auction" may be used, for example. The same site may also handle subsequent sales by stock sellers 460 and purchases by stock repurchasers 450, effectively performing as a market maker in the stock. The IP IT itself may manage the on-line auction and resale site. However, in the preferred primary embodiment, the IP IT contracts with an outside organization to conduct the initial stock sales and transfers, collect and forward the proceeds, and maintain and transmit transaction logs in return for a fee. The IP IT receives the proceeds from the initial stock sale along with stock purchaser identification information 416 which it processes 417. It sends required financial disclosure information 418. All of the transactions among the IP IT 410, its website 420, the on-line auction and resale site 430 and the stock purchasers and sellers 440, 450, and 460 incorporate procedures, hardware, and software 419 to protect the integrity of the information. Dividends are distributed through procedures 422 and appropriate records are maintained and transmitted to tax authorities and other regulatory agencies.

Type of development differs between IP and RE in that an undivided RE interest can generally be developed for only one type of use at a time. For example, RE cannot be simultaneously both a golf course and a shopping center. However, IP can be simultaneously developed for many uses. The notion of "best and highest use" which is so important in real estate valuation does not apply to IP valuation. IP valuation can be considered the cumulative total of all valuations for all uses.

RE value generally changes over time, even if no development occurs. It is usually positive, but may go negative due to associated liabilities such as in the case of hazardous waste deposits where the owner may have the responsibility for clean-up costs in excess of the value of the property. RE generally has unlimited life.

IP value also generally changes over time even if no development occurs. It is also usually positive, but may go negative due to associated liabilities such as in the case of patent infringement claims. IP life is not unlimited. Patents, copyrights, and derivative rights expire. Often the market life is shorter than the legal life, as newer IP seizes the market.

Both RE and IP may use one or more predictive models such as neural networks to generate estimates of property value. The predictive models generate these estimates based on learned relationships among variables describing individual property characteristics. The models also learn relationships between individual property characteristics, and area or market characteristics. Area or market characteristics are stored and applied at a level of area or market specificity that varies according to the amount of data available at each of several successively larger areas or markets. In this way the models are able to capture local neighborhood, or submarket characteristics without unduly reducing sample sizes, which would reduce reliability and predictability.

The learned relationships among individual property characteristics and area or market characteristics enable the system to estimate the value of the property being appraised. Error models may also be provided to generate an estimated value range or error interval for the sales price. The appraised value and error estimate may then be provided as output to a human decision-maker, along with other related information such as: reason codes that reveal the relative contributions of various factors to the appraised value; and various measures of market trends. Finally, the system periodically monitors its performance, and redevelops the model when performance drops below a predetermined level.

Determining value of an intellectual property asset generally includes two parts. First, a legal analysis is conducted to confirm the validity and enforceability of the patent or other intellectual property asset. For a patent, this generally involves a validity search and opinion, confirmation of correct ownership of the patent, correct inventorship of the patent, and an analysis of the enforceability of the patent. This analysis may include, for example, not only a study of prior art patents and literature but also may include interviews, histories, depositions, etc. of inventors or other relevant persons familiar with the matter. The likelihood of the patent or patent application being involved in interference proceedings, and a predicted outcome of the interference, also may be considered.

For a copyright, the analysis generally will involve confirmation of originality in the author. For a trade secret, the analysis will involve confirmation that proper steps have been followed to maintain "trade secret status" under the law. For trademarks and service marks, registrations will be confirmed along with correct usage of the marks and, if necessary, a search to confirm that no prior user rights exist which are not known to the prospective purchaser.

The second step of valuation of the intellectual property asset is the assignment of a monetary value to the intellectual property asset. For example, if the asset is a patent and if one or more claims of the patent are found to be valid and enforceable in the legal analysis, a value is then assigned to the patent. This value can be based, for example, upon the income and profits generated by the sale or use of the patented technology, the number of years remaining on the term of the patent, the breadth of the patent claims, the nature of the patented technology, the nature of competitive products or processes, etc.

REITs are trusts that invests principally in real estate and mortgages. Real Estate Investment Trusts (REITs) provide special tax advantages to their investors. They are taxed only on the income that is not distributed to beneficiaries or shareholders. It is the intent of this inventor to attempt to obtain similar treatment for the Intellectual Property Investment Trusts which are the subject of this invention. The proposed special tax treatment for IP ITs would mimic that of REITs: a person or entity can buy stock in the IP IT; they get capital gain distribution; they also can sell the stock; if the stock is held at least 6 months and sold at a loss, the part of the loss that is equal to or less than the capital gain distribution is reported as long term capital loss; all capital gain distribution is treated as long term capital gain, regardless of how long the stock is owned.

Yet even without the special tax incentives, however, IP ITs offer significant opportunities for investors, inventors, and the economic health of the country.

While the invention has been described in terms of a single preferred embodiment, those skilled in the art will recognize that the invention can be practiced with modification within the spirit and scope of the appended claims.

I claim:

1. A method for developing intellectual property (IP) assets, comprising the steps of:
    collecting one or more IP assets in accordance with a characterization, said characterization being features of interest to potential investors;
    determining an initial market value for the collection in accordance with a plurality of uses for the assets so characterized;
    holding the collection in an investment trust (IT);
    executing an on-line auction of shares in said IT, wherein each of a plurality of investors contribute in return for a share of said IT, an opening bid in said auction for said shares being in proportion to said determined initial market value;
    exploiting the collection, using said contributions to make markets for said plurality of uses and obtain revenue therefrom, and distributing profits to said investors.

2. A method as in claim 1, wherein said characterization is that each of said IP assets involves the same area of technology.

3. A method as in claim 1, wherein said characterization is that each of said IP assets have uses in the same markets for application.

4. A method as in claim 1, wherein said characterization is that each of said IP assets involve the same area of social concern.

5. A method as in claim 1, wherein said characterization is that each of said IP assets would benefit from the same technology breakthrough.

6. A method as in claim 1, wherein said determining step further comprises the steps of:
    describing one of said IP assets in said collection;
    valuing the other IP assets in said collection;
    auctioning ownership of part or all of said one of said IP assets, a resulting auction price being included in the determined initial market value.

7. A method as in claim 6, wherein the valuation of the other IP assets is based upon the present value of the holder of rights to the assets.

8. A method as in claim 6, wherein the valuation of the other IP assets is based upon the estimate of the revenue to be generated during the life of the assets.

9. A method as in claim 6, wherein the valuation of the other IP assets is based upon a successful auction price paid for them.

10. A method as in claim 9, wherein an opening bid in said auction is based on the current market price of a collection of stocks in companies which utilize intellectual property similar to that in the collection.

11. A system for developing intellectual property (IP) assets, comprising:
    means for collecting one or more IP assets in accordance with a characterization, said characterization being features of interest to potential investors;
    means for determining a-an initial market value for the collection in accordance with a plurality of uses for the assets so characterized;
    means for holding the collection in an investment trust (IT);
    means for executing an on-line auction of shares in said IT, wherein each of a plurality of investors contribute in return for a share of said IT, an opening bid in said auction for said shares being in proportion to said determined initial market value;
    means for exploiting the collection, using said contributions to make markets for said plurality of uses and obtain revenue therefrom, and distributing profits to said investors.

12. A system as in claim 11, wherein said characterization is that each of said IP assets involves the same area of technology.

13. A system as in claim 11, wherein said characterization is that each of said IP assets have uses in the same markets for application.

14. A system as in claim 11, wherein said characterization is that each of said IP assets involve the same area of social concern.

15. A system as in claim 11, wherein said characterization is that each of said IP assets would benefit from the same technology breakthrough.

16. A system as in claim 11, wherein said determining means further comprise:
    means for describing one of said IP assets in said collection;
    means for valuing the other IP assets in said collection;
    means for auctioning ownership of part or all of said one of said IP assets, a resulting auction price being included in the determined initial market value.

17. A system as in claim 16, wherein the valuation of the other IP assets is based upon the present value of the holder of rights to the assets.

18. A system as in claim 16, wherein the valuation of the other IP assets is based upon the estimate of the revenue to be generated during the life of the assets.

19. A system as in claim 16, wherein the valuation of the other IP assets is based upon a successful auction price paid for them.

20. A system as in claim 19, wherein an opening bid in said auction is based on the current market price of a collection of stocks in companies which utilize intellectual property similar to that in the collection.

* * * * *